3,130,307
NEUTRON FLUX INTENSITY DETECTION
James T. Russell, Richland, Wash., assignor to the United States of America as represented by the United States Atomic Energy Commission
Filed Mar. 2, 1962, Ser. No. 177,142
8 Claims. (Cl. 250—83.1)

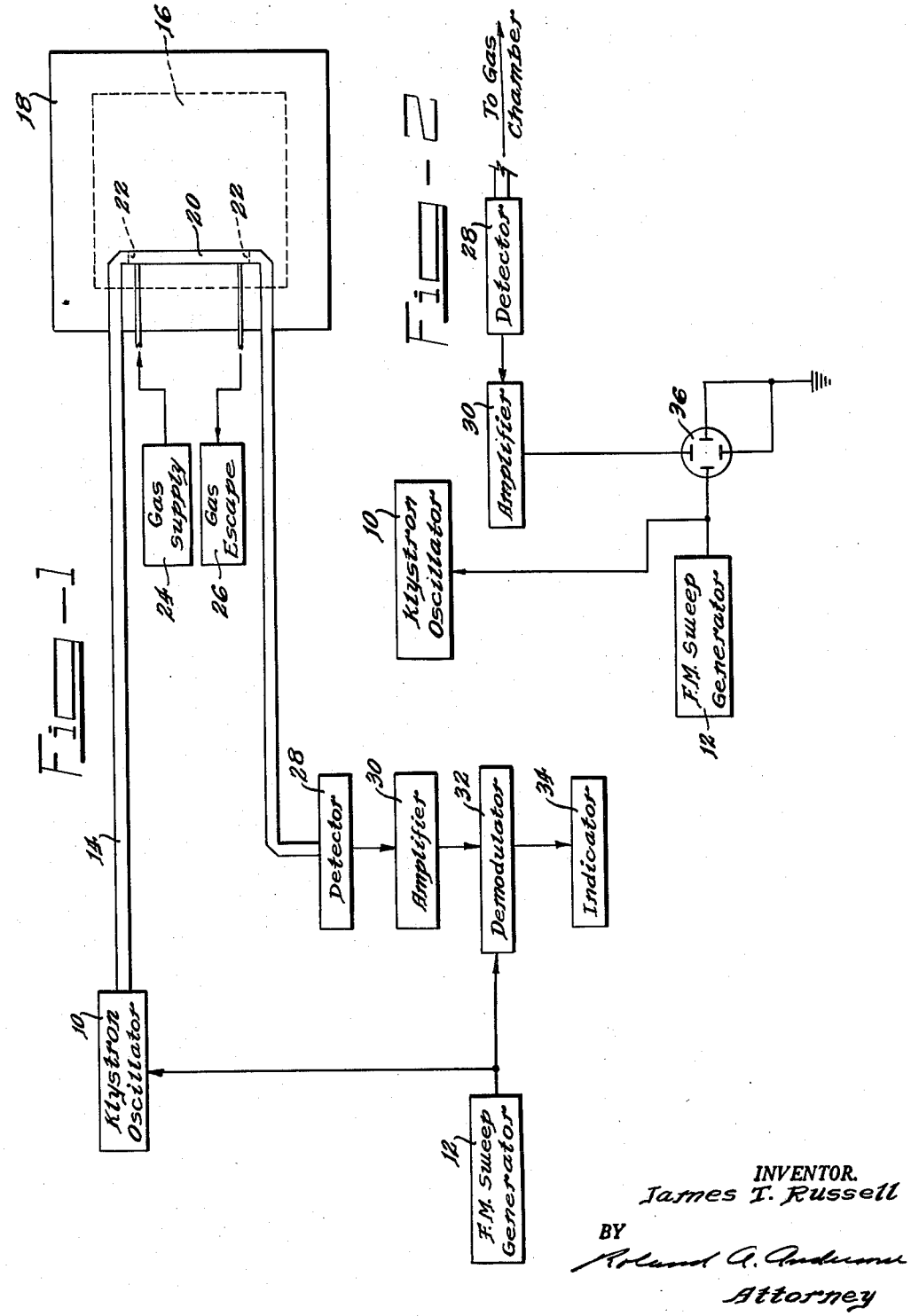

This invention relates generally to a method of measuring the neutron flux, or power level, of a nuclear reactor.

In the prior art the monitoring of nuclear reactors has been accomplished by ionization chambers placed in the reactor core wherein alpha particles are produced by neutron bombardment. The ionization produced by the alpha particles results in an electric current proportional to the intensity of the neutron flux.

Ionization chambers have an inherent drawback in that part of the electrical apparatus associated therewith must be contained within the reactor itself. Such apparatus naturally requires periodic maintenance. Also, means must be employed to shield the chamber from radiations other than neutron particles. It has been considered that a method of measuring neutron intensity by means external to the reactor would be to observe the radioactive particles in the output of the coolant system. Although such a scheme would be entirely independent from the reactor core itself, the problem of unwanted radioactive contamination reduces the efficiency and discrimination of such a system. Besides, further problems would result due to the need for proper handling of the radioactive material after it had been utilized as an indication of the reactor operation.

It is therefore an object of this invention to provide a method of measuring the intensity of a beam of neutrons.

It is another object of this invention to provide a method of measuring the neutron flux of a nuclear reactor.

It is another object of this invention to provide a method of measuring the neutron flux of a nuclear reactor wherein the means for accomplishing this result are substantially external to the reactor itself.

It is still another object of this invention to provide a simple, sensitive and discriminatory method whereby the power level of a nuclear reactor may be measured by equipment external to the reactor itself, the actual connection with the reactor proper being accomplished wholly by means requiring no adjustment or further maintenance after installation.

Other objects will become apparent as a detailed description proceeds.

In general, this invention utilizes a phenomenon exhibited by certain gases and gaseous compounds whereby the composition of said gases undergo a transmutation to another species or nuclide upon being bombarded by thermal neutrons. Certain transmutation products thus created exhibit strong resonant absorption lines on the microwave spectrum and may be detected by the attenuation that said products offer to a beam of microwave energy at that particular absorption frequency. In accordance with the principles of the present invention, if it is desired to measure the neutron flux in the core of a nuclear reactor, a preselected target gas is passed through the reactor at a constant rate. The density of the transmutation product thus formed is a measure of the neutron flux, the density of the product being detected by the aforesaid microwave absorption technique.

Along with the information to follow, a more complete understanding of the invention will be obtained from a consideration of the accompanying drawings, in which:

FIGURE 1 is a block diagram of an embodiment capable of putting into practice the teachings of this method; and FIGURE 2 is a modification of the embodiment shown in FIGURE 1.

Following FIGURE 1 to illustrate the operation of this invention, a klystron oscillator 10 generates microwave energy of a particular frequency. The microwave signal is frequency modulated at a low sweep frequency by FM sweep generator 12. Sweep generator 12 effects modulation by varying at the sweep frequency the voltage applied to the repeller plates of klystron 10, thus causing the output frequency of the klystron to vary in accordance with said voltage variations. The frequency modulated signal is then transmitted along a wave guide 14 to the core 16 of a nuclear reactor 18. Once wave guide 14 is within the reactor core 16 in a position where neutron flux is present, a gas chamber 20 is formed by the placement of wave guide windows 22 in the wave guide so as to form an airtight chamber. Gas chamber 20 is supplied by a gas supply 24 and contains a gas escape outlet 26. The microwave energy passes along wave guide 14 through chamber 20 to detector 28, amplifier 30, and a demodulator 32. The demodulator 32 also receives the sweep signal from the FM sweep generator 12 and produces a D.C. output that is monitored by the indicator 34.

FIGURE 2 shows a modification of the above wherein the sweep generator 12 and amplifier 30 outputs are impressed across the plates of an oscilloscope 36 as an alternate means of monitoring the signal.

Neutron flux from the reactor core 16 will be incident upon the gas chamber 20 which contains a gas capable of being transmuted by neutron absorption to a product having a strong resonant absorption line at a particular microwave frequency. The gas supply 24 and gas escape 26 maintain chamber 20 at the proper pressure for the particular gas being bombarded and also cause said gas to be introduced into and expelled from said chamber at a constant rate. The windows 22 that effect the vacuum seal may be composed of thin mica or quartz. The microwave energy from oscillator 10 is set at the frequency that corresponds to this resonant absorption line and is modulated by the FM sweep generator 12 so that a broad band of radiation is passed through the wave guide 14 and hence through the chamber 20. Preferably, the width of the microwave frequency band would be adjusted to be approximately twice the width of the absorption line.

When neutron flux is present in the gas chamber, the microwave frequencies present therein will be attenuated, over a portion, preferably approximately one half, of the band width, to a degree which corresponds to the number of transmutation products present therein, which, in turn, corresponds to the neutron flux. The detector 28 therefore receives a signal which is unattenuated a portion of the time and subject to attenuation during the remaining portion of a given period. Detector 28 rectifies this signal so as to produce a unidirectional current. After amplification, this detected signal is synchronized with the sweep from sweep generator 12 in the demodulator 32, and a D.C. output is obtained that corresponds inversely to the neutron flux intensity. A conventional phase sensitive demodulator may be utilized.

The modification shown in FIGURE 2 merely uses an oscilloscope 36 in the conventional manner to produce a graphical, visual indication of the neutron flux level.

The gases that may be used to produce transmutation products after bombardment with thermal neutrons must have a sufficient microscopic neutron absorption cross section to affect appreciable neutron capture. Furthermore, the gas utilized or its post neutron bombardment products must exhibit strong microwave spectrum absorption lines. One such gas is nitrogen and, in accordance with the $N^{14}(n, p)C^{14}$ reaction, $CO_2$ will form in the presence of oxygen. $N^{14}$ has a microscopic cross section of 1.8 barns for the n,p reaction, and the $CO_2$ formed has a spectrum line approximately 25 megacycles wide at a frequency of approximately 23,250 megacycles per second. For this gas, the pressure in the chamber would be maintained at several atmospheres of pressure because the $CO_2$ has no dipole moment at atmospheric pressure. The crowding of molecules induces a dipole moment. Thus the invention could be practiced by feeding nitrogen and oxygen into chamber 22 and detecting the amount of $CO_2$ produced by the aforesaid microwave absorption technique. The oscillator 10 would be set at approximately 23,250 mc. and frequency modulated between approximately 23,225 and 23,275 mc.

Another gas suitable for this invention is chlorotrifluoromethane in which the $Cl^{35}$ of the natural chlorine atom undergoes a transmutation upon neutron bombardment to $Cl^{36}$. $CL^{35}$ has a microscopic cross section of 44 barns, and the product containing $Cl^{36}$ has a microwave absorption line approximately 25 megacycles wide at a frequency of approximately 26,500 megacycles per second. The chlorotrifluoromethane would be maintained at a pressure of from one to ten centimeters of mercury. The invention could, therefore, be practiced in a fashion analogous to that aforesaid by setting oscillator 10 at approximately 26,500 mc. and modulating same between approximately 26,475 and 26,525 mc.

It should be understood that although, $C^{14}$ and $Cl^{36}$ happen to be radioactive, the present method has the advantage that it does not depend upon the transmutation product being radioactive. It is only necessary as aforesaid that the target gas have a sufficiently high microscopic cross section and that its transmutation product exhibit a strong and discrete microwave absorption line. As an alternative, if the target atom displays a strong absorption line, it is possible to measure the decrease in the microwave absorption due to the depletion of the target atom, rather than measuring the increase in absorption of the microwave energy at the frequency of the absorption line of the transmutation product.

It should be noted that transmutation products (and target gases) often display absorption lines at several frequencies. Both the product containing $Cl^{36}$ and $CO_2$ have several absorption lines. Therefore, it is to be understood that the aforementioned frequencies were chosen because the absorption at these frequencies is strong and so especially suited to the practice of this invention. No limitation as to specific frequencies is intended.

In summary, this invention employs a gas capable of transmutation by neutron bombardment. The gas is caused to flow at a constant rate through a holding chamber that is subjected to microwave radiation and to the neutron flux which it is desired to measure. Techniques of microwave spectroscopy are then utilized to indicate the density of the transmutation product to thereby indicate the intensity of the neutron flux. Such a method is quite sensitive and possesses a high degree of discrimination as it is responsive only to the action of thermal neutrons. It will be apparent that it is not essential that the density of the transmutation product be measured within the reactor proper. It is necessary only that the target gas be passed through the reactor at a constant rate and the density of the transmutation product thus formed be measured. This latter step could be performed outside of the reactor after the gas has passed through.

It will be understood that this invention is not to be limited to the details given herein, but that it may be modified within the scope of the appended claims.

What is claimed is:

1. A method of measuring the instantaneous intensity of the neutron flux in the core of a nuclear reactor comprising: passing through said core at a constant rate a target gas capable of being transmuted by neutron bombardment to a product having a resonant absorption line at a particular microwave frequency, passing microwave energy of said frequency through said gas, and measuring the attenuation of said energy due to the formation of said product.

2. The method according to claim 1, wherein said microwave energy is frequency modulated so as to have a bandwidth approximately twice the width of said resonant absorption line.

3. A method of measuring the instantaneous intensity of the neutron flux in the core of a nuclear reactor comprising: passing through said core at a constant rate nitrogen and oxygen gas at a pressure of several atmospheres, passing microwave energy through said gas at a frequency that corresponds to the frequency of a resonant absorption line of $CO_2$, and measuring the attenuation of said energy after passage through said gas.

4. The method according to claim 3, wherein the frequency of said microwave energy is approximately 23,250 megacycles per second.

5. The method according to claim 4, wherein said microwave energy is frequency modulated to a bandwidth of approximately 50 megacycles.

6. A method of measuring the instantaneous intensity of the neutron flux in the core of a nuclear reactor comprising: passing through said core at a constant rate chlorotrifluoromethane gas at a pressure of from 1 to 10 centimeters of mercury, passing microwave energy through said gas at a frequency that corresponds to the frequency of a resonant absorption line of the molecule $CF_3Cl^{36}$, and measuring the attenuation of said energy after passage through said gas.

7. The method according to claim 5, wherein the frequency of said microwave energy is approximately 26,500 megacycles per second.

8. The method according to claim 7, wherein said microwave energy is frequency modulated to a bandwidth of approximately 50 megacycles.

References Cited in the file of this patent

UNITED STATES PATENTS 2,982,855    Wickersham _____ May 2, 1961